United States Patent [19]

Orain

[11] Patent Number: 4,747,322

[45] Date of Patent: May 31, 1988

[54] CONTROLLED TORQUE TRANSFER DIFFERENTIAL FOR A MOTOR VEHICLE

[75] Inventor: Michel A. Orain, Conflans Sainte Honorine, France

[73] Assignee: Glaenzer Spicer, Poissy, France

[21] Appl. No.: 759,912

[22] Filed: Jul. 29, 1985

[30] Foreign Application Priority Data

Aug. 1, 1984 [FR] France ................................. 84 12220

[51] Int. Cl.⁴ ............................................. F16H 1/38
[52] U.S. Cl. ....................................... 74/715; 74/710; 74/459.5
[58] Field of Search .............. 74/715, 713, 711, 710.5, 74/710, 458, 459.5

[56] References Cited

U.S. PATENT DOCUMENTS

| | | | |
|---|---|---|---|
| 1,248,687 | 12/1917 | Logue | 74/715 |
| 1,257,279 | 3/1918 | Patch | 74/715 |
| 1,487,073 | 3/1924 | Nogrady | 74/711 |
| 1,711,546 | 5/1929 | Scurlock | 74/711 |
| 1,719,803 | 7/1929 | Fickett | 74/711 |
| 1,748,813 | 2/1930 | Wildhaber | 74/459.5 |
| 2,866,354 | 12/1958 | Wildhaber | 74/459.5 |
| 2,896,467 | 7/1959 | Saari | 74/459.5 |
| 3,253,483 | 5/1966 | McCaw | 74/715 X |
| 3,930,424 | 1/1976 | Myers | 74/711 |
| 4,037,492 | 7/1977 | Ashauer et al. | 74/713 X |
| 4,513,635 | 4/1985 | Takimura et al. | 74/710 X |

FOREIGN PATENT DOCUMENTS

| | | |
|---|---|---|
| 0094870 | 11/1983 | European Pat. Off. . |
| 737667 | 6/1943 | Fed. Rep. of Germany . |
| 674518 | 1/1930 | France . |
| 1270107 | 7/1960 | France . |
| 129949 | 8/1982 | Japan ..................................... 74/713 |
| 137643 | 8/1983 | Japan ..................................... 74/713 |
| 123783 | 3/1919 | United Kingdom . |

Primary Examiner—Lawrence Staab
Assistant Examiner—David Novais
Attorney, Agent, or Firm—Wenderoth, Lind & Ponack

[57] ABSTRACT

A differential which includes a housing (1a, 1b) through which axially extend two shafts (4, 5) for driving the driving wheels of the vehicle, sun gears (7, 8) mounted in the housing (1a, 1b) in coaxial relation to the shafts (4, 5) and connected to rotate with the latter, planet gears (13, 14) journalled in the housing to rotate about a shaft (15) perpendicular to the two shafts (4, 5) and fixed at its ends to the housing, these planet gears (13, 14) being cooperative with the sun gears (7, 8). The sun gears (7, 8) and the planet gears (13, 14) are provided with helicospiral sets of teeth of opposite directions, whose teeth (40, 41) are inclined to an axial plane passing through the teeth at a given angle ($\alpha$) as a function of the desired transfer rate for the torque from one shaft (4, 5) to the other (5, 4) and the set of teeth of each sun gear (7, 8) and each planet gear (13, 14) has, when viewed in an axial plane of the sun gears (7, 8), a perpendicular section formed by segments of flanks, (18, 20; 25, 26) perpendicular to the axis (OX) of the shafts (4, 5) and segments of flanks (19, 30; 27, 29) parallel to the axis (OX).

11 Claims, 2 Drawing Sheets

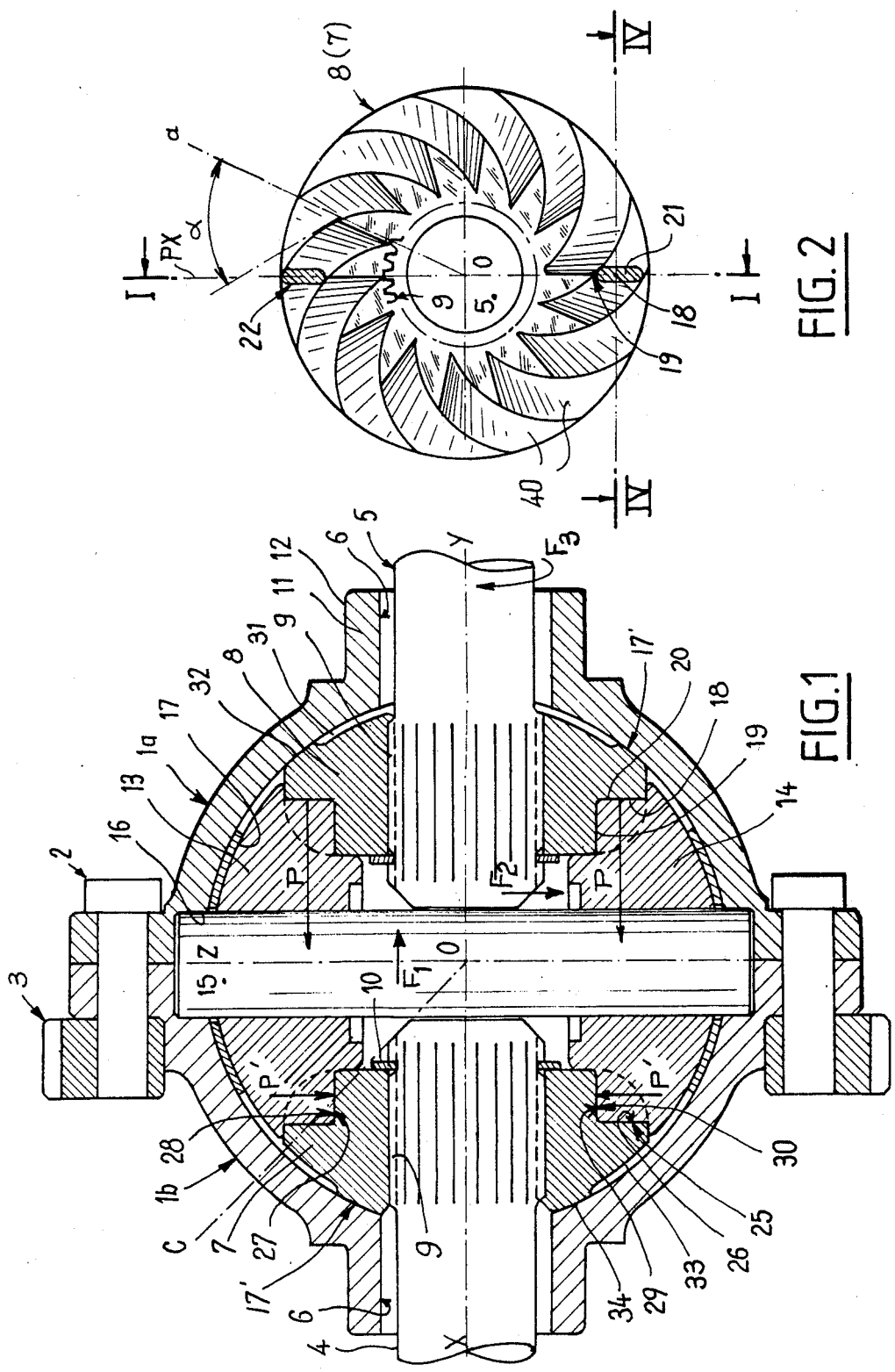

CONTROLLED TORQUE TRANSFER DIFFERENTIAL FOR A MOTOR VEHICLE

BACKGROUND OF THE INVENTION

1. Field of the Invention

The present invention relates to a differential for a motor vehicle.

More particularly, the differential of the invention comprises a housing through which axially extend two shafts driving the driving wheels of the vehicle, sun gears mounted in the housing coaxially with the shafts and rigid with the latter as concerns rotation, planet gears journalled in the housing to rotate about a shaft perpendicular to the shafts and fixed at its ends to the housing, these planet gears being cooperative with the sun gears.

2. Description of the Prior Art

It is known that this type of mechanism has a function of dividing in a judicious manner the driving torque between each of both left and right driving wheels of a vehicle so as to ensure a maximum amount of traction in th case of ground having slippery regions while permitting driving on an adhering road which is as precise and certain as with a conventional differential.

It is also known that a conventional differential equally divides the torrques between the two driving wheels, which constitutes a drawback of considerably reducing the traction when one of the driving wheels bears against a slippery surface of the ground.

Generally, the differentials having a limited slip or self-locking differentials employ the friction between the surfaces in permanent contact pertaining either to stacks of disks or to cones. It has the drawback of high instability of their corrective action which may result in zero efficiency or in a relative locking of the two wheels in an erratic and unforseeable manner. These drawbacks are mainly due to variations in the coefficients of sliding of the rubbing surfaces and variations in the sliding rate in the different stages of the meshing of the sun gears and planet gears of these differentials.

There is consequently a disturbance in the precision of the driving of the vehicle when the frictions are excessively high (bad road holding), since the resulting traction force may very distinctly shift from the left to the right of the vehicle and, when the friction is insufficient, there is an absence of traction when a wheel encounters ground without adherence.

SUMMARY OF THE INVENTION

An object of the invention is therefore to provide a differential mechanism having a stable correcting action and capable of ensuring a torque transfer rate of constant value from the non-adhering wheel to the adhering wheel and employing substantially standard housings of conventional differentials with the same simple arrangement of the sun gears and planet gears.

According to the invention, the sun and planet gears are provided with helicospiral teeth of opposite directions, the teeth of which are inclined to an axial plane passing through the teeth at a given angle as a function of the desired torque transfer rate from one shaft to the other, and the teeth of each sun gear and each planet gear have, when viewed in an axial plane of the sun gears, a perpendicular section composed of segments of flanks perpendicular to the axis of the shafts and segments of flanks parallel to this axis.

These sun gears and planet gears may be economically produced by a hot or cold forming operation without subsequent rectification, and their geometric characteristics correlating to the aforementioned features permit the obtainment of the desired transfer rate for the particular application, in particular as a function of the value of the slope angle of the teeth on the different radial planes passing through the teeth.

BRIEF DESCRIPTION OF THE DRAWINGS

Further features and advantages of the invention will be apparent from the following description with reference to the accompanying drawings which illustrate an embodiment by way of a non-limiting example. In the drawings:

FIG. 1 is a semi-sectional, semi-elevational view in an axial plane of the sun gears along I—I of FIG. 2 of an embodiment of the differential mechanism for a motor vehicle according to the invention;

FIG. 2 is an elevational view in the direction of arrow F1 of FIG. 1, of a sun gear of the differential;

DETAILED DESCRIPTION OF THE PREFERRED EMBODIMENTS

Figure 4:
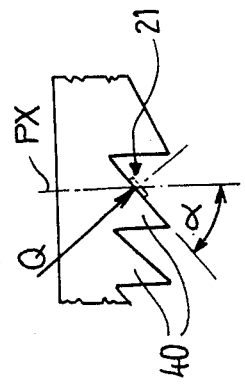
FIG. 4 is a partial sectional view taken on line IV—IV of FIG. 2.

The mechanism illustrated in FIGS. 1 to 4 is a differential for a motor vehicle comprising a housing, which is formed in this embodiment by two semi-shells 1a, 1b which are fixed and centered relative to each other by means of bolts 2 which also hold in position a large ring gear 3 which is in the presently-described embodiment formed by a spur gear wheel.

The housing 1a, 1b has axially extending therethrough two shafts 4, 5 driving the driving wheels (not shown) of the vehicle, these shafts entering opposite sides of the housing 1a, 1b through cylindrical openings 6 and being disposed coaxially relative to each other on a common geometric axis OX. The shafts 4, 5 are fixed to respective sun gears 7, 8 for axial rotation therewith. The sun gears 7, 8 are coaxial with the corresponding shafts 4, 5, and are fixed to the shafts 4, 5 by means of longitudinal splines 9 formed on the periphery of the shafts 4, 5 which engage corresponding grooves in the sun gears 7, 8 and by circlips 10 coaxial with the shafts 4, 5 and retaining the sun gears 7, 8 on the latter. The housing 1a, 1b has two oppositely disposed neck portions 11 whose outside diameters 12 are ground for the purpose of being fitted in the inner bore of respective rolling bearings (not shown). The differential further comprises two planet gears 13, 14 journalled in the housing 1a, 1b to rotate about a shaft 15 which has a central axis perpendicular to the common axis of shafts 4, 5 and which is fixed at its ends in bores 16 machined in the semi-shells 1a, 1b in accordance with a known technique.

A sliding washer 17 may be interposed between the spherical housing 1a, 1b and the planet gears 13, 14 as in the embodiment illustrated in FIG. 1, and/or the sun gears 7, 8 (as shown by way of graphical drawing symbol 17'), so as to create a slight resilient pre-stressing by employing the principle of Belleville washers.

Figure 3:
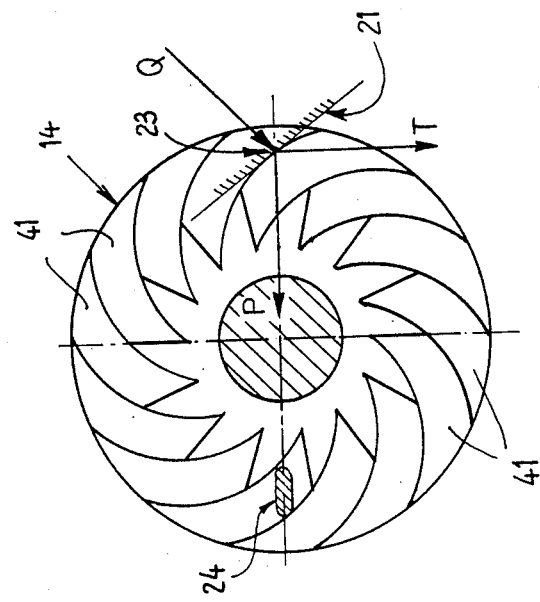
FIG. 3 is an elevational view in the direction of arrow F2 of FIG. 1, of a planet gear of the differential.

When viewed from a respective axial end surface facing the interior of the spherical housing 1a, 1b, the sun gears 7, 8 have helicospiral teeth 40 extending counter clockwise about the axes of rotation thereof, as shown in FIG. 2 and the planet gears 13, 14 have helicospiral teeth 41 extending clockwise about the axes of rotation thereof, as shown in FIG. 3. However, the directions shown in FIGS. 2 and 3 could be reversed. Thus, the helicospiral sets of teeth of each of the sun gears extend from the axial end surface thereof in a first direction about a corresponding axis of rotation thereof and the helicospiral sets of teeth of each of said planet gears extend from the axial end surface thereof in a second direction about a corresponding axis of rotation thereof, the first direction being opposite to the second direction.

The respective teeth 40, 41 (FIGS. 4 and 3) are inclined to an axial plane Oa passing through the teeth at a given angle α, as a function of the desired torque transfer rate from one shaft 4, 5 to the other. Thus, the teeth of each set of helicospiral teeth comprise two flanks which form an edge of a respective tooth which is inclined to a respective axial plane passing through a corresponding axis of rotation of one of the gears, with an angle measured between the respective axial plane and a tangent to the edge being preselected as a function of a desired transfer rate for the torque from one shaft to the other of the two shafts 4 and 5.

The teeth have, as viewed in a plane parallel to the common axis of the shafts 4, 5, a triangular section comprised of two flanks which may be seen in particular in FIG. 4, each flank of the teeth being either parallel or perpendicular to the respective axis of rotation of the gear (7, 8, 13, 14). The planet gears (13, 14) and sun gears (7, 8) have the same dimensions and would be identical if the directions of their helices were not opposed. The teeth 40, 41 are in contact solely by one of their two flanks for each direction of applied torque thereto, and the teeth do not have a crest or a root.

The teeth of each sun gear 7, 8 and each planet gear 13, 14 form, when viewed in the axial plane PX of the sun gears 7, 8, i.e. in the plane of FIG. 1, a perpendicular section composed of segments of the flanks of the teeth which are perpendicular to the common axis OX of the shafts 4, 5 and segments of the flanks of the teeth which are parallel to this axis.

There can thus be seen in FIG. 2 the sun gear 8 associated with the shaft 5 whose set of teeth is formed by helicospiral teeth 40 extending from an axial end surface adjacent the periphery of the shaft 5 to the periphery of the sun gear 8 adjacent the inner wall of the housing, this set of teeth being "left" according to the usual terminology in mechanical engineering by likeness to a screwthread. The slope of the flanks of the teeth 40 measured between a tangent to the flanks and the vector radius Oa is defined by an angle α which is about 45° in the presently-described embodiment. The teeth 40 have flanks 18, 19 constituting the aforementioned perpendicular section in a plane passing through the axis OX of the sun gears 7, 8, the flanks 18 being perpendicular to this axis OX while the flanks 19 are parallel to the latter. The flanks 18, 19 thus form a sprocket shaped pattern on the axial end surface of the sun gear 8. The width of the teeth 40, defined by their number, may vary without substantially modifying the torque transfer characteristics of the differential. The mean axis shown by OC (FIG. 1) is inclined at an angle 45° to the axis OX and to the shaft 15 carrying the planet gears.

The planet gears 13, 14 have sets of teeth similar to those of the sun gears 7, 8 but of opposite direction (FIG. 3). In other words, if the set of teeth of the two sun gears 7, 8 is "left", that of the two planet gears 13, 14 is "right", as in FIGS. 1, 2 and 3, and vice-versa. The teeth of the sun gear 7 form, in a plane containing the axis OX of this sun gear, a perpendicular section corresponding to that of the sun gear 8, i.e. a segment of flank 26 perpendicular to the axis OX and a segment of flank 30 parallel to this axis. These flanks cooperate with complementary flanks 25, 29 of the planet gear 14, while the planet gear 13 also has, in the plane of FIG. 1, a perpendicular section formed in part by a segment of a flank 27 parallel to this axis OX. This segment of the flank 27 of the planet gear 13 cooperates with the segment of a flank 28 of the sun gear 7.

According to a feature of the invention, one of the sun gears 7, 8, namely the sun gear 8 in the presently-described embodiment has, in its spherical periphery adjacent the semi-shell 1a, a spherically shaped recess 31 radially inward of a zone of this sun gear 8 which is radially outermost from the axis OX of the differential, the radially outermost zone forming a first annular bearing surface 32 bearing against the spherical inner surface of the semi-shell 1a. Further, the second sun gear 7 has, in its region from the axis OX of its radially outermost spherical periphery adjacent the semi-shell 1b, an annular cavity or recess 33 which is radially outward from a second annular bearing surface 34 formed on the sun gear 7 adjacent the associated shaft 4 and bearing against the spherical inner surface of the semi-shell 1b.

The sun gears 7, 8 thus include respective annular surfaces 34, 32 forming bearing surfaces which rub against the corresponding inner wall of the semi-shells 1a, 1b, and perform a function which will be explained hereinafter.

The differential just described operates in the following manner:

When the shaft 5 tends to rotate under the effect of a torque F3 (FIG. 1), the flanks such as 18 of the sun gear 8 compress the tangent flanks such as 20 of the planet gear 14, the zone of contact 21 therebetween being represented by a shaded area, shown in FIG. 2. There must be associated with this area a second zone of contact 22 (between sun gear 8 and planet gear 13) located symmetrically in the upper part of FIGS. 1 and 2. The zone of contact 21 of the sun gear 8 transmits a load Q received on the zone of contact 23 (FIG. 3) of the planet gear 14 whose component along OX is P.

The zone of contact 21 of the sun gear 8 is tangent to the zone of contact 23, of the planet gear 14 which implies that the slope of these two surfaces 21, 23 in the radial direction is equal to the slope in the axial direction (FIG. 4), or in other words, the slope of the mean line of the helicospiral teeth projected in elevation is equal to the slope projected in plan view in order to allow simultaneous meshing and tangential contact of the flanks of the teeth.

Under the effect of a component T of the original load Q, the planet gear 14 tends to rotate and drive on a zone of contact 24 thereon (FIG. 3) the sun gear 7 by applying thereto a force Q' (not shown) less than Q, owing to the passive resistances due to the sliding. By an identical effect, the force Q' drives the sun gear 7 with other losses due to the sliding between the flanks 29 and 30, and 27 and 28. The components P' perpendicular to the axis OX of the differential (FIG. 1) force the axial bearing surfaces of the planet gears 13, 14 against the interior of the housing, and add other frictional torques.

The transmission of the torque occurs with similar sliding losses for the zones of contact of the upper and symmetrical part of FIG. 1, so that the assembly of the sun gears 7, 8, and the planet gears 13, 14 contribute to the transfer of the torque from the shaft 5 to the shaft 4, with high friction due to the sliding, not only between the engaging sets of teeth, but also between the bearing surfaces of of the sun gears 7, 8 or planet gears 13, 14 which bear against the interior of the housing 1a, 1b. If the direction of the force F3 exerted on the shaft 5 is reversed, it is the flanks 19, which are oriented parallel to the axis OX, which supply a thrust component perpendicular to OX, and therefore along the axis OZ of the planet gear carrier shaft 15.

In the differential according to the invention, the torque transfer rate may be established at the desired value by modifying the angle $\alpha$. If the angle $\alpha$ is large, for example on the order of 70°, the torque transfer rate will be on the order of 1, and the irreversibility and the behavior of slave wheels will be approached. If the angle $\alpha$ is on the order of 30°, conventional differentials which have a very low torque transfer rate will be approached.

The differential according to the invention may also be advantageously employed between the front and rear sets of vehicles of four-wheel drive wheels. In this case, different rates of transfer may be obtained, depending on whether the front wheels tend to rotate faster or more slowly than the rear wheels.

The differential according to the invention may therefore be included in the kinematic chain driving the four driving wheels of an overland vehicle, it being placed in particular between the front set of wheels and the rear set of wheels, so as to permit a differential rotation between these two sets of wheels, while retaining a sufficient torque transfer rate. This produces a sufficient traction resultant in the case where the rear set of wheels, or the front set of wheels, encounters a zone of zero adherence.

According to the invention, the rate of transfer may be fixed by construction at two different values depending on whether the differential torque applied to one of the output shafts 4, 5 is in one direction or the other.

For example, a differential torque F3 applied to the shaft 5 in the case of FIG. 1 in the direction indicated by the arrow, creates reactions Q of axial components P on the two zones of contact 21 and 22 of the sun gear 8 which tend to urge it against the wall of the semi-shell 1a. The application of the sun gear 8 against the housing therefore occurs along the annular bearing surface 32, which increases the friction torque and consequently the rate of transfer of the differential. It will be observed that, in this case, the sun gear 7 is subjected to no axial thrust resulting from this differential torque F3.

On the other hand, if the differential torque is applied to the shaft 5 in the direction opposed to that of arrow F3, the sun gear 8 no longer receives an axial component of the teeth reaction, but the sun gear 7 receives an axial component of the reciprocal reaction of the teeth 25 and 26 and transmits this axial reaction through its bearing surface 34 to the semi-shell 1b. This reduces the friction torque and correspondingly the rate of transfer. It will be observed that, in this case, the sun gear 8 is not subjected to an axial force on the part of the reactions of contact on the flanks 19 of its teeth.

It must be understood that the invention is not intended to be limited to the described embodiment, since it may be modified. Thus, if it is desired to have the same rate of transfer in both directions of the differential torque, the bearing surfaces of the sun gears 7, 8 bearing against the inner wall of the housing 1a, 1b must have the same bearing surfaces or equivalent bearing surfaces as concerns the developed friction torque under equal axial load.

I claim:

1. A differential for a motor vehicle comprising a housing, a first shaft and a second shaft for driving driving wheels of a vehicle extending axially through the housing, sun gears mounted in the housing coaxially with said shafts and connected to rotate with said shafts, each of said sun gears having an axial end surface facing towards the center of said housing, a third shaft having ends fixed to the housing and perpendicular to the first and second shafts, planet gears rotatively mounted on the third shaft and each of said planet gears having an axial end surface facing towards said center of said housing, said planet gears being cooperative with said sun gears, the sun gears and the planet gears having helicospiral sets of teeth, said helicospiral sets of teeth of each of said sun gears extending from said axial end surface thereof in a first direction about a corresponding axis of rotation thereof and said helicospiral sets of teeth of each of said planet gears extending from said axial end surface thereof in a second direction about a corresponding axis of rotation thereof, said first direction being opposite to said second direction, the teeth of said sets each comprising two flanks which form an edge of a respective tooth which is inclined to a respective axial plane passing through a corresponding axis of rotation of one of said gears, with an angle measured between said respective axial plane and a tangent to said edge being preselected as a function of a desired transfer rate for the torque from one shaft to the other of said first and second shafts, and the set of teeth of each sun gear and each planet gear having, when viewed in an axial plane of the sun gears, a perpendicular section comprising segments of one of said two flanks which are perpendicular to the axis of the first and second shafts and segments of the other of said two flanks which are parallel to the axis of the first and second shafts.

2. A differential according to claim 1, wherein the housing has a spherical inner surface, one of the sun gears has a spherical periphery adjacent the housing and a spherically shaped recess in said spherical periphery radially inward of a zone thereof which is radially outermost from the axis of the first and second shafts, the radially outermost zone forming a first annular bearing surface bearing against the spherical inner surface of the housing, and the second sun gear has a spherical periphery adjacent the housing and an annular recess in a region of its spherical periphery facing the housing which is radially outermost from a zone thereof which is radially innermost from the axis of the first and second shafts, the radially innermost zone on the second sun gear forming a second annular bearing surface adjacent to a respective one of said first and second shafts and bearing against the spherical inner surface of the housing, the first annular bearing surface being capable of increasing the friction torque between the first sun gear and the housing and consequently the transfer rate of the differential, when the first shaft extending through the first sun gear is subjected to a differential torque in a given direction, while, inversely, the second annular bearing surface reduces the friction torque and the rate of transfer when the differential torque is applied to the first shaft in an opposite direction.

3. A differential according to claim 2, wherein a sliding washer is interposed between the housing and each of the planet gears so as to create a resilient pre-stressing.

4. a differential according to claim 1, wherein the sun gears each have a recess and an annular bearing surface formed on a spherical periphery thereof axially facing toward a respective spherical cavity formed in the housing, the two annular bearing surfaces bearing against the housing and coaxial with the first and second shafts ensuring equal friction torques and consequently equal torque transfer rates for the two possible directions of the differential torque between the first and second driving shafts.

5. A differential according to claim 4, wherein a sliding washer is interposed between the housing and each of the planet gears so as to create a resilient pre-stressing.

6. A differential according to claim 1, wherein a sliding washer is interposed between the housing and each of the planet gears so as to create a resilient pre-stressing.

7. A differential according to claim 1, wherein a sliding washer is interposed between the housing and each of the sun gears so as to create a resilient pre-stressing.

8. A differential according to claim 1, wherein a sliding washer is interposed between the housing and each of the planet gears and between the housing and each of the sun gears so as to create a resilient pre-stressing.

9. A differential according to claim 1, wherein said sun gears and said planet gears have the same size and a mean axis therebetween of 45°.

10. A differential according to claim 1, wherein each of said sun gears and said planet gears comprises a hot formed material.

11. A differential according to claim 1, wherein each of said sun gears and said planet gears comprises a cold formed material.

* * * * *